US008284848B2

(12) United States Patent
Nam et al.

(10) Patent No.: US 8,284,848 B2
(45) Date of Patent: Oct. 9, 2012

(54) DIFFERENTIAL DATA TRANSFERRING SYSTEM AND METHOD USING THREE LEVEL VOLTAGES

(75) Inventors: Jang Jin Nam, Yongin-si (KR); Yong Weon Jeon, Seongnam-si (KR)

(73) Assignee: TLI Inc., Seongnam-Si (KR)

( * ) Notice: Subject to any disclaimer, the term of this patent is extended or adjusted under 35 U.S.C. 154(b) by 297 days.

(21) Appl. No.: 12/725,405

(22) Filed: Mar. 16, 2010

(65) Prior Publication Data
US 2011/0038425 A1   Feb. 17, 2011

(30) Foreign Application Priority Data

Aug. 11, 2009   (KR) .......................... 10-2009-0073709

(51) Int. Cl.
*H04B 3/00*   (2006.01)
(52) U.S. Cl. ...................................... 375/257; 375/244
(58) Field of Classification Search ................. 375/257
See application file for complete search history.

(56) References Cited

U.S. PATENT DOCUMENTS

| | | | |
|---|---|---|---|
| 6,026,124 A | 2/2000 | Lee et al. | |
| 6,178,198 B1 | 1/2001 | Samueli et al. | |
| 6,295,323 B1 * | 9/2001 | Gabara | 375/257 |
| 6,359,931 B1 | 3/2002 | Perino et al. | |
| 6,556,628 B1 * | 4/2003 | Poulton et al. | 375/257 |
| 6,570,934 B1 * | 5/2003 | Harada | 375/316 |
| 6,792,105 B1 * | 9/2004 | Moyer | 379/402 |
| 6,842,037 B1 | 1/2005 | Gradl | |
| 7,042,254 B2 * | 5/2006 | Hori | 327/65 |
| 7,061,406 B1 * | 6/2006 | Dally et al. | 341/50 |
| 7,072,355 B2 | 7/2006 | Kizer | |
| 7,088,270 B1 * | 8/2006 | Dally et al. | 341/70 |
| 7,508,881 B2 * | 3/2009 | Choi et al. | 375/288 |

(Continued)

FOREIGN PATENT DOCUMENTS

KR   1020040087351 A   10/2004

(Continued)

OTHER PUBLICATIONS

"Multilevel Differential Encoding With Precentering for High-Speed Parallel Link Transceiver", by Jae-Yoon Sim et al., IEEE Journal of Solid-State Circuits, vol. 40, No. 8, Aug. 2005, pp. 1688-1694.

(Continued)

*Primary Examiner* — David Ometz
*Assistant Examiner* — Santiago Garcia
(74) *Attorney, Agent, or Firm* — Kile Park Goekjian Reed & McManus PLLC

(57) ABSTRACT

A differential data transferring system and method uses three level voltages to simultaneously transfer three signals (for example, two data signals and one clock signal) across two transfer line sets (i.e., four transfer lines). Therefore, the differential data transferring method increases transferring efficiency by using fewer transfer lines. Also, according to the differential data transferring system and method, one of two transfer lines forming a transfer line set is controlled to a middle voltage level, while the other transfer line is controlled to either a high voltage or a low voltage. Accordingly, the voltage difference between the two transfer lines may be maintained at a constant amplitude. Additionally, the difference between first and second dividing voltages DC1 and DC2, which are used for generating a reference output data, is controlled to maintain a constant amplitude. Therefore, the differential data transferring system and method may provide improved operation reliability.

15 Claims, 4 Drawing Sheets

U.S. PATENT DOCUMENTS

| | | | |
|---|---|---|---|
| 7,692,563 B2* | 4/2010 | Hamada et al. | 341/56 |
| 7,697,628 B2* | 4/2010 | Choi | 375/288 |
| 7,741,900 B1* | 6/2010 | Li | 327/540 |
| 7,746,937 B2* | 6/2010 | Miller | 375/257 |
| 7,983,347 B2* | 7/2011 | Hamada et al. | 375/244 |
| 8,009,784 B2* | 8/2011 | Ko | 375/360 |
| 8,081,025 B1* | 12/2011 | Li | 327/540 |
| 2003/0201802 A1* | 10/2003 | Young | 327/108 |
| 2004/0164795 A1* | 8/2004 | Ueno et al. | 330/69 |
| 2004/0239374 A1* | 12/2004 | Hori | 327/65 |
| 2005/0068067 A1* | 3/2005 | Kim | 327/78 |
| 2006/0006942 A1* | 1/2006 | Ueno et al. | 330/258 |
| 2006/0013331 A1* | 1/2006 | Choi et al. | 375/288 |
| 2007/0024359 A1* | 2/2007 | Yamaji et al. | 330/69 |
| 2008/0007508 A1* | 1/2008 | Yoneyama | 345/100 |
| 2008/0024222 A1* | 1/2008 | Moane et al. | 330/258 |
| 2008/0064359 A1* | 3/2008 | Yamaji et al. | 455/341 |
| 2008/0165168 A1* | 7/2008 | Tsuchi | 345/204 |
| 2008/0218237 A1* | 9/2008 | Elrich | 327/306 |
| 2008/0304578 A1* | 12/2008 | Matsubara et al. | 375/257 |
| 2009/0003464 A1* | 1/2009 | Matsubara et al. | 375/257 |
| 2010/0052966 A1* | 3/2010 | Tsuchi | 341/154 |
| 2010/0321573 A1* | 12/2010 | Bohm | 348/554 |

FOREIGN PATENT DOCUMENTS

| | | |
|---|---|---|
| KR | 1020060044114 A | 5/2006 |
| KR | 1020070074289 A | 7/2007 |
| KR | 1020090035964 A | 4/2009 |

OTHER PUBLICATIONS

"TLDS (Ternary Lines Differential Signaling), A New Serial Interface for Cost Effective TFT-LCD", by Jaegan Ko et al., 2005 SID International Symposium Digest of Technical Papers, vol. XXXVI, Book I, May 2005, p. 45.

* cited by examiner

DIFFERENTIAL DATA TRANSFERRING SYSTEM AND METHOD USING THREE LEVEL VOLTAGES

BACKGROUND OF THE INVENTION

1. Field of the Invention

The present invention relates to a differential data transferring system, and more particularly to a differential data transferring system with 3 level voltages for improving a data transferring efficiency.

2. Description of the Related Art

Differential signaling is widely used for transferring data. The differential signaling is a method for transferring differential data. The differential data is transmitted as a pair of plus (+) and minus (−) complementary signals. The differential signaling advantageously has low sensitivity to EMI (electromagnetic interference), high noise immunity, and is capable of use at high data-transfer speeds as compared with single-ended signaling. However, differential signaling requires two transfer lines for each transmitted differential signal. That is, the differential signaling has the disadvantage that more transfer lines are required for differential signaling as compared with single-ended signaling.

SUMMARY OF THE INVENTION

Accordingly, the present invention has been made keeping in mind the above problems occurring in the prior art, and an object of the present invention is to provide a differential data transferring system and method to improve the efficiency in transferring data.

In accordance with one aspect of the present invention to accomplish the above object, there is provided a differential data transferring system for transferring a first transfer data signal, a second transfer data signal and a reference transfer data signal through a first transfer line set and a second transfer line set to generate a first output data signal, a second output data signal and a reference output data signal, in which the first transfer line set includes a first plus transfer line and a first minus transfer line and the second transfer line set includes a second plus transfer line and a second minus transfer line. The differential data transferring system comprises a data transmitting portion operative to control or selectively couple one of the first plus transfer line and the first minus transfer line to a first middle voltage level and control or selectively couple the other of the first plus transfer line and the first minus transfer line to one of a first high voltage and a first low voltage according to the first transfer data signal and the reference transfer data signal, the data transmitting portion operative to control or selectively couple one of the second plus transfer line and the second minus transfer line to a second middle voltage level and control or selectively couple the other of the second plus transfer line and the second minus transfer line to one of a second high voltage and a second low voltage according to the second transfer data signal and the reference transfer data signal, wherein the first middle voltage is between the first high voltage and the first low voltage, and wherein the second middle voltage is between the second high voltage and the second low voltage; and a data receiving portion operative to generate the first output data signal, the second output data signal and the reference output data signal, wherein the first output data signal depends on the voltage levels in the first plus transfer line and the first minus transfer line, and the second output data signal depends on the voltage levels in the second plus transfer line and the second minus transfer line, and the reference output data signal depends on a first dividing voltage and a second dividing voltage, and wherein the first dividing voltage is generated by dividing the voltages between the first plus transfer line and the first minus transfer line, and the second dividing voltage is generated by dividing the voltages between the second plus transfer line and the second minus transfer line.

In accordance with another aspect of the present invention to accomplish the above object, there is provided a differential data transferring method for transferring a first transfer data signal, a second transfer data signal and a reference transfer data signal through a first transfer line set and a second transfer line set to generate a first output data signal, a second output data signal and a reference output data signal, in which the first transfer line set includes a first plus transfer line and a first minus transfer line and the second transfer line set includes a second plus transfer line and a second minus transfer line. The differential data transferring method comprises a data transmitting step for controlling one of the first plus transfer line and the first minus transfer line to a first middle voltage level and controlling the other of the first plus transfer line and the first minus transfer line to one of a first high voltage and a first low voltage according to the first transfer data signal and the reference transfer data signal, the data transmitting step of controlling one of the second plus transfer line and the second minus transfer line to a second middle voltage level and controlling the other of the second plus transfer line and the second minus transfer line to one of a second high voltage and a second low voltage according to the second transfer data signal and the reference transfer data signal, wherein the first middle voltage is between the first high voltage and the first low voltage, and wherein the second middle voltage is between the second high voltage and the second low voltage; and a data receiving step of generating the first output data signal, the second output data signal and the reference output data signal, wherein the first output data signal depends on the voltage levels in the first plus transfer line and the first minus transfer line, and the second output data signal depends on the voltage levels in the second plus transfer line and the second minus transfer line, and the reference output data signal depends on a first dividing voltage and a second dividing voltage, and wherein the first dividing voltage is generated by dividing the voltages between the first plus transfer line and the first minus transfer line, and the second dividing voltage is generated by dividing the voltages between the second plus transfer line and the second minus transfer line.

In a preferable embodiment, the first transfer data signal and the second transfer data signal are transited simultaneously with the reference transfer data signal.

In another preferable embodiment, the first transfer data signal and the second transfer data signal are transited at the different time with the reference transfer data signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
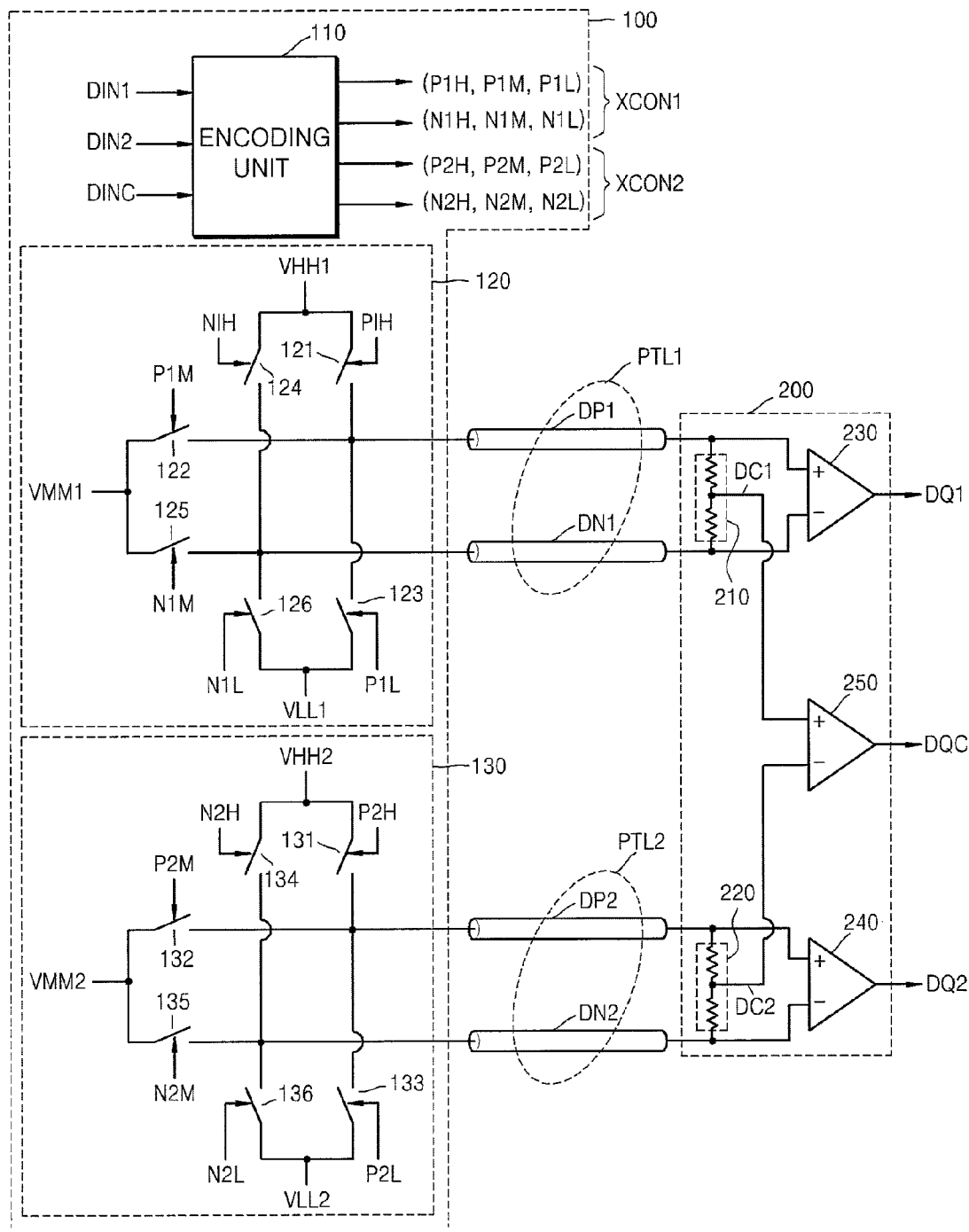
FIG. 1 is a drawing showing a differential data transferring system according to an embodiment of the present invention.

Reference now should be made to the drawings, in which the same reference numerals are used throughout the different drawings to designate the same or similar components. In the following description of the present invention, detailed descriptions may be omitted if it is determined that the detailed descriptions of related well-known functions and construction may make the gist of the present invention unclear.

Differential Data Transferring System

FIG. 1 is a drawing showing a differential data transferring system according to an embodiment of the present invention. Referring to FIG. 1, the differential data transferring system of the present invention transfers a first transfer data signal DIN1, a second transfer data signal DIN2 and a reference transfer data signal DINC through a first transfer line set PTL1 and a second transfer line set PTL2, and generates a first output data signal DQ1, a second output data signal DQ2 and a reference output data signal DQC.

At this time, the first transfer data signal DIN1, the second transfer data signal DIN2 and the reference transfer data signal DINC carry the information corresponding to the first output data signal DQ1, the second output data signal DQ2 and the reference output data signal DQC, respectively. Preferably, the reference transfer data signal DINC and the reference output data signal DQC are used as 'clock signal', performing the reference for other data and signals.

The first transfer line set PTL1 includes a first plus transfer line DP1 and a complementary first minus transfer line DN1, and the second transfer line set PTL2 includes a second plus transfer line DP2 and a complementary second minus transfer line DN2.

The differential data transferring system of the present invention comprises a data transmitting portion 100 and a data receiving portion 200.

The data transmitting portion 100 controls the first plus transfer line DP1 and the first minus transfer line DN1, according to the first transfer data signal DIN1 and the reference transfer data signal DINC. At this time, one of the first plus transfer line DP1 and the complementary first minus transfer line DN1 is controlled to a first middle voltage level VMM1, according to the first transfer data signal DIN1 and the reference transfer data signal DINC. And, the other of the first plus transfer line DP1 and the complementary first minus transfer line DN1 is controlled to one of a first high voltage VHH1 and a first low voltage VLL1, according to the first transfer data signal DIN1 and the reference transfer data signal DINC.

In an exemplary embodiment of the invention, the first middle voltage VMM1 is the average of the first high voltage VHH1 and the first low voltage VLL1. Accordingly in such an embodiment, the voltage difference between of the first plus transfer line DP1 and the first minus transfer line DN1 is maintained at a constant amplitude equal to the difference between the middle voltage and either of the high or the low voltage (note that while the amplitude of the voltage difference may remain constant, the sign of the voltage difference may vary depending on the signals being transmitted across the transfer lines). In various embodiments of the invention, the first middle voltage level VMM1 may be a common-mode voltage level, a ground voltage level, or any other suitable voltage level.

Also, the data transmitting portion 100 controls the second plus transfer line DP2 and the complementary second minus transfer line DN2, according to the second transfer data signal DIN2 and the reference transfer data signal DINC. At this time, one of the second plus transfer line DP2 and the second minus transfer line DN2 is controlled to a second middle voltage level VMM2, according to the second transfer data signal DIN2 and the reference transfer data signal DINC. And, the other of the second plus transfer line DP2 and the second minus transfer line DN2 is controlled to one of a second high voltage VHH2 and a second low voltage VLL2, according to the second transfer data signal DIN2 and the reference transfer data signal DINC.

In an exemplary embodiment of the invention, the second middle voltage VMM2 is the average of the second high voltage VHH2 and the second low voltage VLL2. Accordingly in such an embodiment, the voltage difference between of the second plus transfer line DP2 and the second minus transfer line DN2 is maintained constant. In other embodiments of the invention, the second middle voltage level VMM2 may be a common-mode voltage level, a ground voltage level, or any other suitable voltage level.

In an exemplary embodiment of the invention, the data transmitting portion 100 comprises an encoding unit 110, a first data loading unit 120 and a second data loading unit 130.

The encoding unit 110 generates a first control signal group XCON1 and a second control signal group XCON2. At this time, the logic states of the signals in the first control signal group XCON1 are dependent on the first transfer data signal DIN1 and the reference transfer data signal DINC. And, the logic states of the signals in the second control signal group XCON2 are dependent on the second transfer data signal DIN2 and the reference transfer data signal DINC.

In this embodiment, the first control signal group XCON1 includes a first high plus signal P1H, a first middle plus signal P1M, a first low plus signal P1L, a first high minus signal N1H, a first middle minus signal N1M and a first low minus signal N1L. And, the second control signal group XCON2 includes a second high plus signal P2H, a second middle plus signal P2M, a second low plus signal P2L, a second high minus signal N2H, a second middle minus signal N2M and a second low minus signal N2L.

The first data loading unit 120 controls a selected one of the first plus transfer line DP1 and the first minus transfer line DN1 and sets the voltage on the selected one of the transfer lines equal to the first middle voltage level VMM1, the selected one of the transfer lines being selected according to the first control signal group XCON1. The first data loading unit 120 further controls the other of the first plus transfer line DP1 and the first minus transfer line DN1 and sets the voltage on the other of the transfer lines equal to one of the first high voltage VHH1 and the first low voltage VLL1, the one of the first high voltage VHH1 and the first low voltage VLL1 being selected according to the first control signal group XCON1.

The first data loading unit 120 comprises a first high plus switch 121, a first middle plus switch 122, a first low plus switch 123, a first high minus switch 124, a first middle minus switch 125 and first low minus switch 126.

The first high plus switch 121 selectively couples the first plus transfer line DP1 to the first high voltage VHH1, the first high plus switch responding to the first high plus signal P1H. The first middle plus switch 122 selectively couples the first plus transfer line DP1 to the first middle voltage VMM1, the first middle plus switch responding to the first middle plus signal P1M. And, the first low plus switch 123 selectively couples the first plus transfer line DP1 to the first low voltage VLL1, the first low plus switch responding to the first low plus signal P1L.

The first high minus switch 124 selectively couples the first minus transfer line DN1 to the first high voltage VHH1, the first high minus switch responding to the first high minus signal N1H. The first middle minus switch 125 selectively couples the first minus transfer line DN1 to the first middle voltage VMM1, the first middle minus switch responding to the first middle minus signal N1M. And, the first low minus switch 126 selectively couples the first minus transfer line DN1 to the first low voltage VLL1, the first low minus switch responding to the first low minus signal N1L.

At this time, a selected one of the first middle plus signal P1M and the first middle minus signal N1M is activated, according to the first transfer data signal DIN1 and the reference transfer data signal DINC. When the first middle minus signal N1M is activated, one of the first high plus signal P1H and the first low plus signal P1L is activated. And, when the first middle plus signal P1M is activated, one of the first high minus signal N1H and the first low minus signal N1L is activated.

Therefore, according to the first transfer data signal DIN1 and the reference transfer data signal DINC, one of the first plus transfer line DP1 and the first minus transfer line DN1 is set equal to a first middle voltage level VMM1, and the other of the first plus transfer line DP1 and the first minus transfer line DN1 is set equal to one of a first high voltage VHH1 and a first low voltage VLL1.

The second data loading unit 130 controls a selected one of the second plus transfer line DP2 and the second minus transfer line DN2 and sets the voltage on the selected one of the transfer lines equal to the second middle voltage level VMM2, the selected one of the transfer lines being selected according to the second control signal group XCON2. The second data loading unit further controls the other of the second plus transfer line DP2 and the second minus transfer line DN2 and sets the voltage on the other of the transfer lines equal to one of the second high voltage VHH2 and the second low voltage VLL2, the one of the second high voltage and second low voltage being selected according to the second control signal group XCON2.

The second data loading unit 130 comprises a second high plus switch 131, a second middle plus switch 132, a second low plus switch 133, a second high minus switch 134, a second middle minus switch 135 and second low minus switch 136.

The second high plus switch 131 selectively couples the second plus transfer line DP2 to the second high voltage VHH2, the second high plus switch responding to the second high plus signal P2H. The second middle plus switch 132 selectively couples the second plus transfer line DP2 to the second middle voltage VMM2, the second middle plus switch responding to the second middle plus signal P2M. And, the second low plus switch 133 selectively couples the second plus transfer line DP2 to the second low voltage VLL2, the second low plus switch responding to the second low plus signal P2L.

The second high minus switch 134 selectively couples the second minus transfer line DN2 to the second high voltage VHH2, the second high minus switch responding to the second high minus signal N2H. The second middle minus switch 135 selectively couples the second minus transfer line DN2 to the second middle voltage VMM2, the second middle minus switch responding to the second middle minus signal N2M. And, the second low minus switch 136 selectively couples the second minus transfer line DN2 to the second low voltage VLL2, the second low minus switch responding to the second low minus signal N2L.

At this time, a selected one of the second middle plus signal P2M and the second middle minus signal N2M is activated, according to the second transfer data signal DIN2 and the reference transfer data signal DINC. When the second middle minus signal N2M is activated, one of the second high plus signal P2H and the second low plus signal P2L is activated. And, when the second middle plus signal P2M is activated, one of the second high minus signal N2H and the second low minus signal N2L is activated.

Therefore, according to the second transfer data signal DIN2 and the reference transfer data signal DINC, one of the second plus transfer line DP2 and the second minus transfer line DN2 is set equal to a second middle voltage level VMM2, and the other of the second plus transfer line DP2 and the second minus transfer line DN2 is set equal to one of a second high voltage VHH2 and a second low voltage VLL2.

The data receiving portion 200 shown in FIG. 1 receives signals transmitted on the first plus transfer line DP1, the first minus transfer line DN1, the second plus transfer line DP2 and the second minus transfer line DN2. And, the data receiving portion 200 generates the first output data signal DQ1, the second output data signal DQ2 and the reference output data signal DQC.

The first output data signal DQ1 depends on the voltage levels in the first plus transfer line DP1 and the first minus transfer line DN1. The second output data signal DQ2 depends on the voltage levels in the second plus transfer line DP2 and the second minus transfer line DN2. And, the reference output data signal DQC depends on a first dividing voltage DC1 and a second dividing voltage DC2. In one embodiment, the generated DQ1, DQ2, and DQC signals may be substantially equal to delayed versions of the DIN1, DIN2, and DINC signals, the delay being dependent on the delays of the transmission circuitry 100, the receiving circuitry 200, and the transmission delay across the transfer line sets PTL1 and PTL2.

The first dividing voltage DC1 is generated based on the voltages on the first plus transfer line DP1 and the first minus transfer line DN1. The second dividing voltage DC2 is generated based on the voltages between the second plus transfer line DP2 and the second minus transfer line DN2. In the embodiment shown in FIG. 1, the first dividing voltage DC1 is generated by dividing the voltage between the first plus and first minus transfer lines across a set of two resistors; the second dividing voltage DC2 is generated by dividing the voltage between the second plus and second minus transfer lines across another set of two resistors. If the resistors within each set have the same values, the first and second dividing voltage DC1 and DC2 will be set at electric potentials equal to the mid-points between the voltages carried on the respective transfer lines they are associated with. The dividing voltages may alternatively be generated by other means than the resistors shown in FIG. 1; for example, the dividing voltages may be generated using comparators, amplifiers, or other circuitry.

In an exemplary embodiment, the first dividing voltage DC1 is set equal to an average of the voltages in the first plus transfer line DP1 and the first minus transfer line DN1. And, the second dividing voltage DC2 is set equal to an average of the voltages in the second plus transfer line DP2 and the second minus transfer line DN2.

Also in the exemplary embodiment, the first high voltage VHH1, the first middle voltage VMM1 and the first low voltage VLL1 are equal to the second high voltage VHH2, the second middle voltage VMM2 and the second low voltage VLL2, respectively.

Accordingly, in such an exemplary embodiment, the first dividing voltage DC1 and the second dividing voltage DC2 are controlled with a constant voltage difference. Specifically, the amplitude of the voltage measured between the DC1 and DC2 nodes may have a constant amplitude in such embodiments, even while the sign of the measured voltage varies depending on the data signals transmitted on the transfer lines. In some embodiments, the amplitude of the voltage difference between the DC1 and DC2 nodes may be substantially equal to the voltage difference between the middle voltage levels and either of the high or low voltage levels.

Preferably, the data receiving portion 200 comprises a first divider 210, a second divider 220, a first comparator 230, a second comparator 240 and a dividing comparator 250.

The first divider 210 divides the voltages between the first plus transfer line DP1 and the first minus transfer line DN1, and thus generates the first dividing voltage DC1. And, the second divider 220 divides the voltages between the second plus transfer line DP2 and the second minus transfer line DN2, and thus generates the second dividing voltage DC2.

The first comparator 230 compares the voltages in the first plus transfer line DP1 and the first minus transfer line DN1, and thus generates the first output data signal DQ1 at its output. And, the second comparator 240 compares the voltages in the second plus transfer line DP2 and the second minus transfer line DN2, and thus generates the second output data signal DQ2 at its output.

The dividing comparator 250 compares the first dividing voltage DC1 and the second dividing voltage DC2, and thus generates the reference output data signal DCQ at its output.

A differential data transferring method is described below in which the differential data transferring system of the present invention is used.

Differential Data Transferring Method

Figure 2:
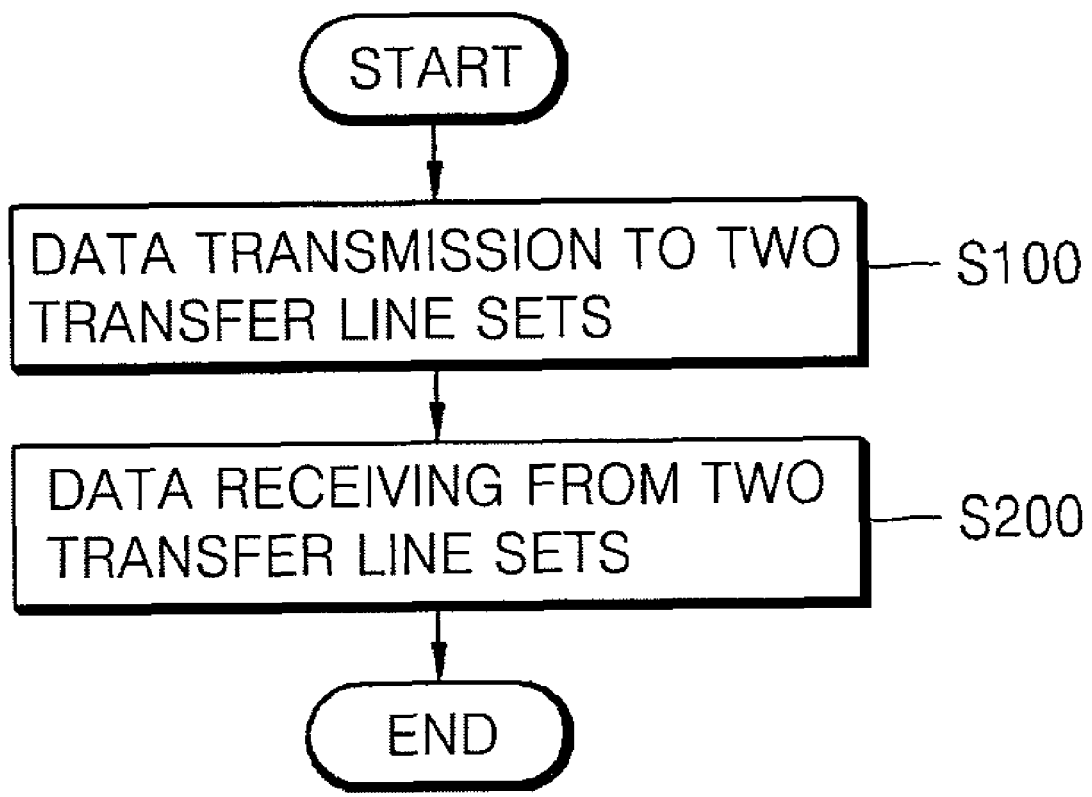
FIG. 2 is a drawing showing a differential data transferring method according to an embodiment of the present invention.

FIG. 2 is a drawing showing a differential data transferring method according to an embodiment of the present invention. For the differential data transferring method according to FIG. 2, the differential data transferring system of the present invention can be used.

Referring to FIG. 2, the differential data transferring method comprises a data transmitting step S100 and a data receiving step S200.

The data transmitting step S100 can be performed in the data transmitting portion 100 of FIG. 1. At the data transmitting step S100, data transmission is performed on two transfer line sets which are driven with three voltage levels. The data transmission may begin with signal encoding, whereby the first, second, and reference transfer data signals are used to generate the control signals P1H, P1M, P1L, N1H, N1M, N1L, P2H, P2M, P2L, N2H, N2M, and N2L. The control signals, which may be digital control signals, may be generated by encoding unit 110 and used to control switches 121-126 and 131-136 of the first and second data loading units 120 and 130. Particular control signals generated based on different input combinations of transfer data signals are described in connection with FIGS. 3 and 4 below. A particular set of control signals may be generated based on transfer data signals received by the encoding unit at the current time. The control signals may alternatively be generated based on transfer data signals received by the encoding unit at a prior time (e.g., in the immediately preceding time-period of operation of the differential transmitting system) and/or at a future time.

At the data transmitting step S100, the first plus transfer line DP1 and the first minus transfer line DN1 are controlled, according to the first transfer data signal DIN1 and the reference transfer data signal DINC. At this time, a selected one of the first plus transfer line DP1 and the first minus transfer line DN1 is controlled to a first middle voltage level VMM1, the selected transfer line being selected according to the first transfer data signal DIN1 and the reference transfer data signal DINC. And, the other selected one of the first plus transfer line DP1 and the first minus transfer line DN1 is selectively controlled to one of a first high voltage VHH1 and a first low voltage VLL1, the selected high or low voltage being selected according to the first transfer data signal DIN1 and the reference transfer data signal DINC. In an exemplary embodiment, the first middle voltage VMM1 is the average of the first high voltage VHH1 and the first low voltage VLL1. As used herein, the phrase "a transfer line is controlled to a voltage or signal" means that the voltage or signal is applied to, electrically or otherwise coupled or connected to, or communicated on the transfer line. The coupling may be direct or indirect, depending on whether a voltage source or node is directly coupled to the transfer line or coupled through a circuit or circuit element.

Also, at the data transmitting step S100, the second plus transfer line DP2 and the second minus transfer line DN2 are controlled, according to the second transfer data signal DIN2 and the reference transfer data signal DINC. At this time, a selected one of the second plus transfer line DP2 and the second minus transfer line DN2 is controlled to a second middle voltage level VMM2, the selected transfer line being selected according to the second transfer data signal DIN2 and the reference transfer data signal DINC. And, the other selected one of the second plus transfer line DP2 and the second minus transfer line DN2 is selectively controlled to one of a second high voltage VHH2 and a second low voltage VLL2, the selected high or low voltage being selected according to the second transfer data signal DIN2 and the reference transfer data signal DINC. In an exemplary embodiment, the second middle voltage VMM2 is the average of the second high voltage VHH2 and the second low voltage VLL2.

Also, in the exemplary embodiment, the first high voltage VHH1, the first middle voltage VMM1 and the first low voltage VLL1 may be set equal to the second high voltage VHH2, the second middle voltage VMM2 and the second low voltage VLL2, respectively.

The data receiving step S200 can be performed in the data receiving portion 200 of FIG. 1. At data receiving step S200, data receiving is performed from two transfer line sets.

At the data receiving step S200, the signals in the first plus transfer line DP1, the first minus transfer line DN1, the second plus transfer line DP2 and the second minus transfer line DN2 are received. And, at the data receiving step S200, the first output data signal DQ1, the second output data signal DQ2 and the reference output data signal DQC are generated.

The first output data signal DQ1 is generated based on the voltage levels in the first plus transfer line DP1 and the first minus transfer line DN1. The second output data signal DQ2 is generated based on the voltage levels in the second plus transfer line DP2 and the second minus transfer line DN2. And, the reference output data signal DQC is generated based on a first dividing voltage DC1 and a second dividing voltage DC2.

At this time, the first dividing voltage DC1 is generated by dividing the voltages between the first plus transfer line DP1 and the first minus transfer line DN1. And, the second dividing voltage DC2 is generated by dividing the voltages between the second plus transfer line DP2 and the second minus transfer line DN2.

In the exemplary embodiment, the first dividing voltage DC1 is set equal to the average of the voltages in the first plus transfer line DP1 and the first minus transfer line DN1. And, the second dividing voltage DC2 is set equal to the average of the voltages in the second plus transfer line DP2 and the second minus transfer line DN2.

Examples of differential data transferring using the data transferring system and methods described in connection with FIGS. 1 and 2 are described below.

An Example for the Differential Data Transferring

Figure 3:
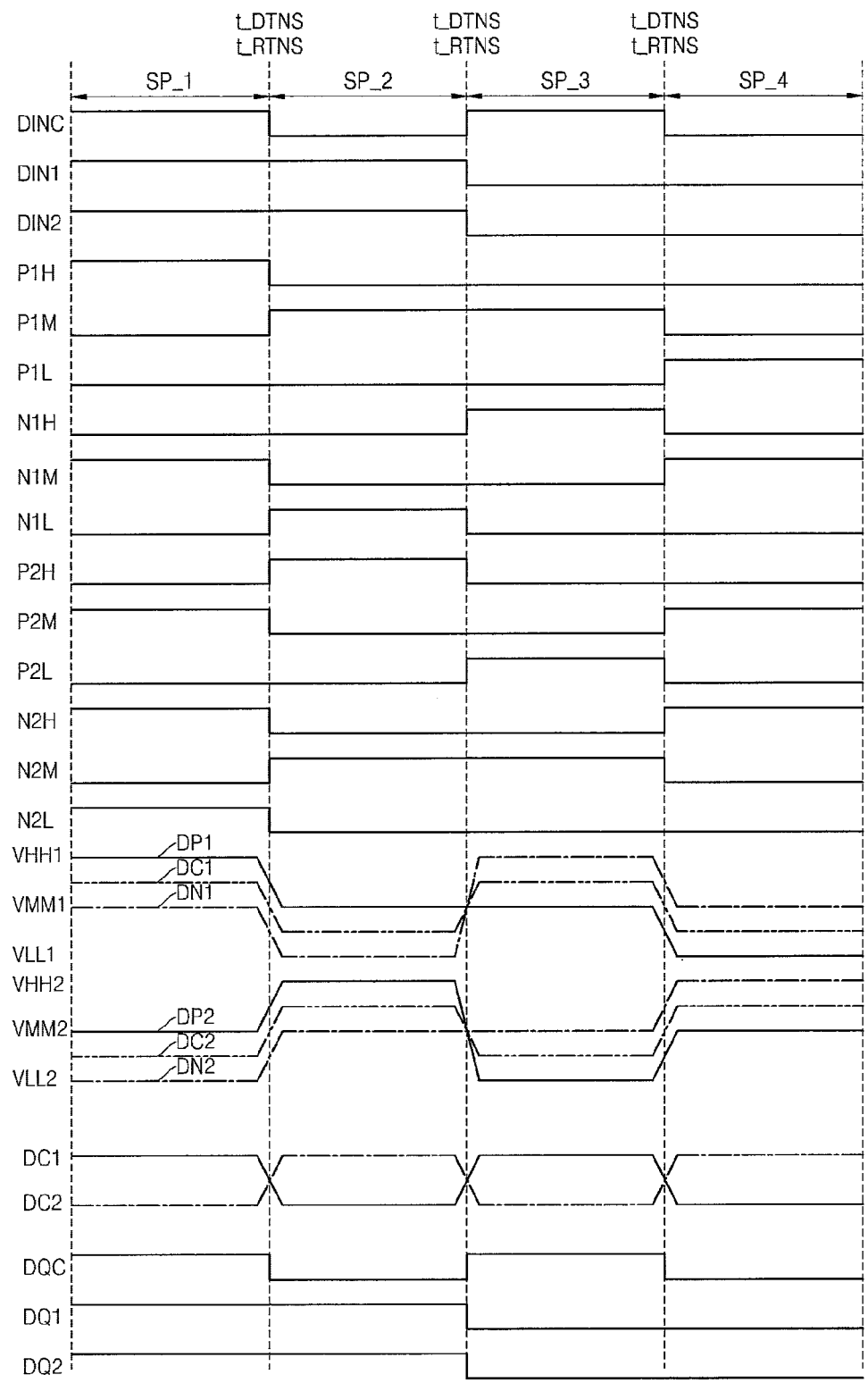
FIG. 3 is a timing diagram showing an example of the differential data transferring of FIG. 2.

FIG. 3 is a timing diagram showing an example of a differential data transmission performed using the differential data transferring method of FIG. 2. The operating period shown in the timing diagram of FIG. 3 may correspond to a period of operation of the sending circuitry 100, the receiving circuitry 200, and/or to the period of operation of circuitry from which the DIN1, DIN2, and DINC signals are received or to which the DQ1, DQ2, and DQC signals are provided.

In the example of FIG. 3, the bits of the first transfer data signal DIN1 and the bits of the second transfer data signal DIN2 can be transited at data transition timing points t_DTNS. And, the bits of the reference transfer data signal DINC can be transited at reference transition timing points t_RTNS. In the example of FIG. 3, the data transition timing points t_DTNS coincide with the reference transition timing points t_RTNS. That is, the first transfer data bits DIN1 and the second transfer data bits DIN2 are transited at the same timing points as the reference transfer data bits DINC.

Referring to FIG. 3, during the period SP_1, all of the first bit of transfer data signal DIN1, the first bit of second transfer data signal DIN2 and the first bit of reference transfer data signal DINC are logic "H" or HIGH.

During the period SP_1, the first high plus signal P1H is activated to "H" and causes switch 121 to couple the first plus transfer line DP1 to the high voltage VHH1, and the first middle minus signal N1M is activated to "H" and causes switch 125 to couple the first minus transfer line DN1 to the middle voltage VMM1. The second middle plus signal P2M is activated to "H" and causes switch 132 to couple the second plus transfer line DP2 to the middle voltage VMM2, and the second low minus signal N2L is activated to "H" and causes switch 136 to couple the second minus transfer line DN2 to the low voltage VLL2.

Therefore, in the period SP_1, the first plus transfer line DP1 is controlled to the first high voltage VHH1, and the first minus transfer line DN1 is controlled to the first middle voltage VMM1. The second plus transfer line DP2 is controlled to the second middle voltage VMM2, and the second minus transfer line DN2 is controlled to the second low voltage VLL2.

Accordingly, in the period SP_1, the first dividing voltage DC1 is higher than the second dividing voltage DC2.

As a result, the logic states of the first output data DQ1 and the second output data DQ2 are "H", which are same as those of the first bit of first transfer data signal DIN1 and the first bit of second transfer data signal DIN2. And, the logic state of the reference output data DQC is "H", which is same as that of the first bit of reference transfer data signal DINC.

During the period SP_2, the logic states of the first transfer data signal DIN1 and the second transfer data signal DIN2 are "H", and the logic state of the reference transfer data signal DINC is "L".

During the period SP_2, the first middle plus signal P1M is activated to "H" and causes switch 122 to couple the first plus transfer line DP1 with the middle voltage VMM1, and the first low minus signal N1L is activated to "H" and causes switch 126 to couple the first minus transfer line DN1 to the low voltage VLL1. The second high plus signal P2H is activated to "H" and causes switch 131 to couple the second plus transfer line DP2 to the high voltage VHH2, and the second middle minus signal N2M is activated to "H" and causes switch 135 to couple the second minus transfer line DN2 to the middle voltage VMM2.

Therefore, in the period SP_2, the first plus transfer line DP1 is controlled to the first middle voltage VMM1, and the first minus transfer line DN1 is controlled to the first low voltage VLL1. The second plus transfer line DP2 is controlled to the second high voltage VHH2, and the second minus transfer line DN2 is controlled to the second middle voltage VMM2.

Accordingly, in the period of SP_2, the first dividing voltage DC1 is lower than the second dividing voltage DC2.

As a result, the logic states of the first output data DQ1 and the second output data DQ2 are "H", which are same as those of the second bit of first transfer data signal DIN1 and the second bit of second transfer data signal DIN2. And, the logic state of the reference output data DQC is "L", which is same as that of the second bit of reference transfer data signal DINC.

During the period SP_3, the logic states of the first transfer data signal DIN1 and the second transfer data signal DIN2 are "L", and the logic state of the reference transfer data signal DINC is "H".

During the period SP_3, the first middle plus signal P1M is activated to "H" and causes switch 122 to couple the first plus transfer line DP1 to the middle voltage VMM1, and the first high minus signal N1H is activated to "H" and causes switch 124 to couple the first minus transfer line DN1 to the high voltage VHH1. The second low plus signal P2L is activated to "H" and causes switch 133 to couple the second plus transfer line DP2 to the low voltage VLL2, and the second middle minus signal N2M is activated to "H" and causes switch 135 to couple the second minus transfer line DN2 to middle voltage VMM2.

Therefore, during period SP_3, the first plus transfer line DP1 is controlled to the first middle voltage VMM1, and the first minus transfer line DN1 is controlled to the first high voltage VHH1. The second plus transfer line DP2 is controlled to the second low voltage VLL2, and the second minus transfer line DN2 is controlled to the second middle voltage VMM2.

Accordingly, during period SP_3, the first dividing voltage DC1 is higher than the second dividing voltage DC2.

As a result, the logic states of the first output data signal DQ1 and the second output data signal DQ2 are "L", which are same as those of the first transfer data signal DIN1 and the second transfer data signal DIN2 during period SP_3. And, the logic state of the reference output data signal DQC is "H", which is same as that of the reference transfer data signal DINC during period SP_3.

During period SP_4, the logic states of the first transfer data signal DIN1 and the second transfer data signal DIN2 are "L", and the logic state of the reference transfer data signal DINC is "L".

During period SP_4, the first low plus signal P1L is activated to "H" and causes switch 123 to couple the first plus transfer line DP1 to the low voltage VLL1, and the first middle minus signal N1M is activated to "H" and causes switch 125 to couple the first minus transfer line DN1 to middle voltage VMM1. The second middle plus signal P2M is activated to "H" and causes switch 132 to couple the second plus transfer line DP2 to the middle voltage VMM2, and the second high minus signal N2H is activated to "H" and causes switch 134 to couple the second minus transfer line DN2 to the high voltage VHH2.

Therefore, during period SP_4, the first plus transfer line DP1 is controlled to the first low voltage VLL1, and the first minus transfer line DN1 is controlled to the first middle voltage VMM1. The second plus transfer line DP2 is controlled to the second middle voltage VMM2, and the second minus transfer line DN2 is controlled to the second high voltage VHH2.

Accordingly, during period SP_4, the first dividing voltage DC1 is lower than the second dividing voltage DC2.

As a result, the logic states of the first output data signal DQ1 and the second output data signal DQ2 are "L", which are same as those of the first transfer data signal DIN1 and the second transfer data signal DIN2 during period SP_4. And, the logic state of the reference output data signal DQC is "L", which is same as that of the reference transfer data signal DINC.

According to the example of FIG. 3, three signals (specifically, two data signals DQ1 and DQ2 and one clock signal DQC) can be simultaneously transferred with two transfer line sets, that is, four transfer lines. This means that the differential data transferring method has advantage in transferring data more efficiently (i.e., using fewer transfer lines) than methods of the prior art.

Also, according to the example of FIG. 3, one of the two transfer lines forming a transfer line set is controlled to a middle voltage level, and the other of the two transfer lines is controlled to either a high voltage or a low voltage. Accordingly, the voltage difference between the two transfer lines forming the transfer line set may be maintained constant when the voltage difference between the high voltage level and the middle voltage level is equal to the voltage difference between the middle voltage level and the low voltage level (i.e., when the middle voltage level is set to the average of the high and low voltage levels).

In addition, the amplitude of the potential difference between the first dividing voltage DC1 and the second dividing voltage DC2, which are used for generating a reference output data signal, may also be maintained at a constant amplitude.

Therefore, according to the differential data transferring system and method, the operation reliability is improved.

Meanwhile, the example for the differential data transferring can be changed to various modifications.

Another Example for the Differential Data Transferring

Figure 4:
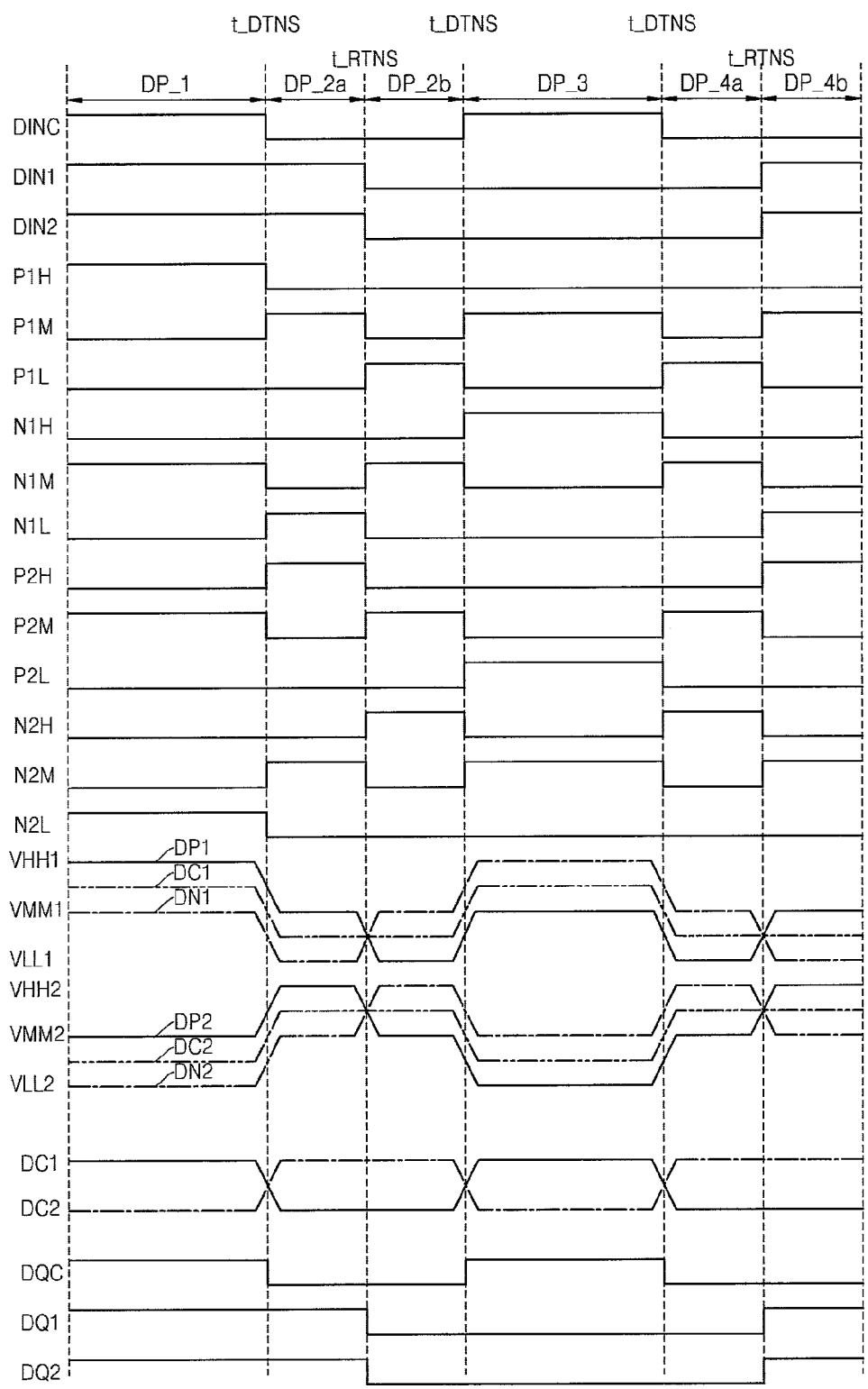
FIG. 4 is a timing diagram showing another example of the differential data transferring of FIG. 2.

FIG. 4 is a timing diagram showing another example of a differential data transmission performed using the differential data transferring method of FIG. 2.

In the example of FIG. 4, the bits of the first transfer data signal DIN1 and the bits of the second transfer data signal DIN2 can be transited at data transition timing points t_DTNS. And, the bits of the reference transfer data signal DINC can be transited at reference transition timing points t_RTNS. In the example of FIG. 4, the data transition timing points t_DTNS are separated from (i.e., do not coincide with) the reference transition timing points t_RTNS. That is, the first transfer data signal DIN1 and the second transfer data signal DIN2 are transited at different timing points than the reference transfer data signal DINC.

In an exemplary embodiment, the first transfer data signal DIN1 and the second transfer data signal DIN2 are transited at the mid-point between transition times of the reference transfer data signal DINC.

In the first period DP_1 and the third period DP_3 of FIG. 4, the first transfer data DIN1 and the second transfer data DIN2 are not transited. In addition, the input signal values DIN1, DIN2, and DINC during the periods DP_1 and DP_3 are the same as those shown during periods SP_1 and SP_3 in FIG. 3. Therefore, in this specification, the description for the periods of DP_1 and DP_3 is omitted.

And, in the second period DP_2 and the fourth period DP_4, the first transfer data DIN1 and the second transfer data DIN2 are transited. In this specification, the second period DP_2 is divided into two sub-periods, specifically the period DP_2a and the period DP_2b. Also, the fourth period DP_4 is divided into two sub-periods, specifically the period DP_4a and the period DP_4b.

Referring to FIG. 4, during period DP_2a, the logic states of the first transfer data signal DIN1 and the second transfer data signal DIN2 are "H", and the logic state of the reference transfer data signal DINC is "L".

During period DP_2a, the first middle plus signal P1M is activated to "H" and causes switch 122 to couple the first plus transfer line DP1 to the middle voltage VMM1, and the first low minus signal N1L is activated to "H" and causes the switch 126 to couple the first minus transfer line DN1 to the low voltage VLL1. The second high plus signal P2H is activated to "H" and causes the switch 131 to couple the second plus transfer line DP2 to the high voltage VHH2, and the second middle minus signal N2M is activated to "H" and causes the switch 135 to couple the second minus transfer line DN2 to the middle voltage VMM2.

Therefore, in the period DP_2a, the first plus transfer line DP1 is controlled to the first middle voltage VMM1, and the first minus transfer line DN1 is controlled to the first low voltage VLL1. The second plus transfer line DP2 is controlled to the second high voltage VHH2, and the second minus transfer line DN2 is controlled to the second middle voltage VMM2.

Accordingly, in the period DP_2a, the first dividing voltage DC1 is lower than the second dividing voltage DC2.

As a result, during period DP_2a, the logic states of the first output data DQ1 and the second output data DQ2 are "H", which are same as those of the first transfer data DIN1 and the second transfer data DIN2. And, the logic state of the reference output data DQC is "L", which is same as that of the reference transfer data DINC.

During period DP_2b, the logic states of the first transfer data DIN1 and the second transfer data DIN2 are "L", and the logic state of the reference transfer data DINC is "L".

In the period of DP_2b, the first low plus signal P1L is activated to "H" and causes switch 123 to couple the first plus transfer line DP1 to the low voltage VLL1, and the first middle minus signal N1M is activated to "H" and causes switch 125 to couple the first minus transfer line DN1 to the middle voltage VMM1. The second middle plus signal P2M is activated to "H" and causes switch 132 to couple the second plus transfer line DP2 to the middle voltage VMM2, and the second high minus signal N2H is activated to "H" and causes switch 134 to couple the second minus transfer line DN2 to the high voltage VHH2.

Therefore, in the period of DP_2b, the first plus transfer line DP1 is controlled to the first low voltage VLL1, and the first minus transfer line DN1 is controlled to the first middle voltage VMM1. The second plus transfer line DP2 is controlled to the second middle voltage VMM2, and the second minus transfer line DN2 is controlled to the second high voltage VHH2.

Accordingly, during period DP_2b, the first dividing voltage DC1 is lower than the second dividing voltage DC2.

As a result during period DP_2b, the logic states of the first output data DQ1 and the second output data DQ2 are "L", which are same as those of the first transfer data DIN1 and the second transfer data DIN2. And, the logic state of the reference output data DQC is "L", which is same as that of the reference transfer data DINC.

During period DP_4a, the logic states of the first transfer data DIN1 and the second transfer data DIN2 are "L", and the logic state of the reference transfer data DINC is "L".

During period DP_4b, the logic states of the first transfer data DIN1 and the second transfer data DIN2 are "H", and the logic state of the reference transfer data DINC is "L".

The input, output, and intermediary signal values during period DP_4a are the same as those of period DP_2b. And, the input, output, and intermediary signal values during period DP_4b are the same as those of period DP_2a. Therefore, the description for the periods DP_4a and DP_4b is omitted in this specification.

According to the example of FIG. 4, three signals (specifically, two data signals DIN1 and DIN2 and one clock signal DINC) can be simultaneously transferred with two transfer line sets, that is, four transfer lines. This means that the differential data transferring method has advantage in transferring data more efficiently (i.e., using fewer transfer lines) that methods of the prior art.

Also, according to the example of FIG. 4, one of the two transfer lines forming a transfer line set is controlled to a middle voltage level, and the other of the two transfer lines is controlled to either a high voltage or a low voltage. Accordingly, the voltage difference between the two transfer lines forming the transfer line set may be maintained constant.

In addition, the potential difference between the first dividing voltage DC1 and the second dividing voltage DC2, which are used for generating a reference output data signal, may also be maintained at a constant potential difference.

Therefore, according to the differential data transferring system and method, the operation reliability is improved.

Also, the maximum transition level of the transfer lines DP1, DN1, DP2 and DN2 in the example of FIG. 4 is half of that in the example of FIG. 3. Specifically, while the transfer lines DP1, DN1, DP2 and DN2 of FIG. 3 may transition directly from a high voltage level to a low voltage level, the transfer lines of FIG. 4 transfer at most between a high voltage level and a middle voltage level, or between a middle voltage level and a low voltage level. Therefore, in case of FIG. 4, the current consumption is reduced, and the operation reliability is more improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the technical scope of the present invention should be defined by the technical spirit of the accompanying claims.

What is claimed is:

1. A differential data transferring system for transferring first, second, and reference transfer data signals through first and second transfer line sets to generate first, second, and reference output data signals, in which the first transfer line set comprises a first plus transfer line and a first minus transfer line and the second transfer line set comprises a second plus transfer line and a second minus transfer line, the differential data transferring system comprising:
a data transmitting portion operative to selectively couple one of the first plus transfer line and the first minus transfer line to a first middle voltage level and selectively couple the other of the first plus transfer line and the first minus transfer line to one of a first high voltage and a first low voltage according to the first transfer data signal and the reference transfer data signal, the data transmitting portion operative to selectively couple one of the second plus transfer line and the second minus transfer line to a second middle voltage level and selectively couple the other of the second plus transfer line and the second minus transfer line to one of a second high voltage and a second low voltage according to the second transfer data signal and the reference transfer data signal, wherein the first middle voltage is between the first high voltage and the first low voltage, and wherein the second middle voltage is between the second high voltage and the second low voltage; and
a data receiving portion operative to generate the first, second, and reference output data signals, wherein the first output data signal depends on the voltage levels in the first plus transfer line and the first minus transfer line, the second output data signal depends on the voltage levels in the second plus transfer line and the second minus transfer line, and the reference output data signal depends on a first dividing voltage and a second dividing voltage, and wherein the first dividing voltage is generated by dividing the voltages between the first plus transfer line and the first minus transfer line, and the second dividing voltage is generated by dividing the voltages between the second plus transfer line and the second minus transfer line.

2. The system of claim 1, wherein the first high voltage, the first middle voltage and the first low voltage are equal to the second high voltage, the second middle voltage and the second low voltage, respectively.

3. The system of claim 1, wherein the data transmitting portion comprises:
an encoding unit to generate a first control signal group and a second control signal group, wherein the first control signal group includes logic signals having logic states depending on the first transfer data signal and the reference transfer data signal, and the second control signal group includes logic signals having logic states depending on the second transfer data signal and the reference transfer data signal;
a first data loading unit to couple the selected one of the first plus transfer line and the first minus transfer line to the first middle voltage level and couple the other of the first plus transfer line and the first minus transfer line to one of the first high voltage and the first low voltage according to the first control signal group; and
a second data loading unit to couple the selected one of the second plus transfer line and the second minus transfer line to the second middle voltage level and couple the other of the second plus transfer line and the second minus transfer line to one of the second high voltage and the second low voltage according to the second control signal group.

4. The system of claim 3, wherein the first control signal group includes:
a first high plus signal, a first middle plus signal, a first low plus signal, a first high minus signal, a first middle minus signal and a first low minus signal, and
wherein the first data loading unit comprises:
a first high plus switch to couple the first plus transfer line to the first high voltage and responding to the first high plus signal;
a first middle plus switch to couple the first plus transfer line to the first middle voltage and responding to the first middle plus signal;

a first low plus switch to couple the first plus transfer line to the first low voltage and responding to the first low plus signal;

a first high minus switch to couple the first minus transfer line to the first high voltage and responding to the first high minus signal;

a first middle minus switch to couple the first minus transfer line to the first middle voltage and responding to the first middle minus signal; and a first low minus switch to couple the first minus transfer line to the first low voltage and responding to the first low minus signal, wherein the selected one of the first middle plus signal and the first middle minus signal is activated according to the first transfer data signal and the reference transfer data signal, wherein the selected one of the first high plus signal and the first low plus signal is activated during activation of the first middle minus signal, and wherein the selected one of the first high minus signal and the first low minus signal is activated during activation of the first middle plus signal.

5. The system of claim 3, wherein the second control signal group includes a second high plus signal, a second middle plus signal, a second low plus signal, a second high minus signal, a second middle minus signal and a second low minus signal, and wherein the second data loading unit comprises a second high plus switch to couple the second plus transfer line to the second high voltage and responding to the second high plus signal;

a second middle plus switch to couple the second plus transfer line to the second middle voltage and responding to the second middle plus signal;

a second low plus switch to couple the second plus transfer line to the second low voltage and responding to the second low plus signal;

a second high minus switch to couple the second minus transfer line to the second high voltage and responding to the second high minus signal;

a second middle minus switch to couple the second minus transfer line to the second middle voltage and responding to the second middle minus signal; and a second low minus switch to couple the second minus transfer line to the second low voltage and responding to the second low minus signal, wherein the selected one of the second middle plus signal and the second middle minus signal is activated according to the second transfer data signal and the reference transfer data signal, wherein the selected one of the second high plus signal and the second low plus signal is activated during activation of the second middle minus signal, and wherein the selected one of the second high minus signal and the second low minus signal is activated during activation of the second middle plus signal.

6. The system of claim 1, wherein the first dividing voltage is an average of the voltages in the first plus transfer line and the first minus transfer line, and wherein the second dividing voltage is an average of the voltages in the second plus transfer line and the second minus transfer line.

7. The system of claim 1, wherein the data receiving portion comprises a first divider for dividing the voltage between the first plus transfer line and the first minus transfer line, and thus generating the first dividing voltage;

a second divider for dividing the voltage between the second plus transfer line and the second minus transfer line, and thus generating the second dividing voltage;

a first comparator for comparing the voltages in the first plus transfer line and the first minus transfer line, and thus generating the first output data signal;

a second comparator for comparing the voltages in the second plus transfer line and the second minus transfer line, and thus generating the second output data signal; and a third comparator for comparing the first dividing voltage and the second dividing voltage, and thus generating the reference output data signal.

8. The system of claim 1, wherein the reference output data signal is a clock signal.

9. A differential data transferring method for transferring first, second, and reference transfer data signals through first and second transfer line sets to generate first, second, and reference output data signals, in which the first transfer line set includes a first plus transfer line and a first minus transfer line and the second transfer line set includes a second plus transfer line and a second minus transfer line, the differential data transferring method comprising:

transmitting the first, second, and reference transfer data signals on the first and second transfer lines sets, the transmitting comprising:

applying a first middle voltage level to a selected one of the first plus transfer line and the first minus transfer line based on the first and the reference transfer data signals, applying one of a first high voltage and a first low voltage to the other of the first plus transfer line and the first minus transfer line based on the first and the reference transfer data signals, applying a second middle voltage level to a selected one of the second plus transfer line and the second minus transfer line based on the second and the reference transfer data signals, applying one of a second high voltage and a second low voltage to the other of the second plus transfer line and the second minus transfer line based on the second and the reference transfer data signals, wherein the first middle voltage is between the first high voltage and the first low voltage, and wherein the second middle voltage is between the second high voltage and the second low voltage; and receiving the first, second, and reference transfer data signals transmitted on the first and second transfer lines sets, the receiving comprising:

generating the first, second and reference output data signals, wherein the first output data signal is generated based on the voltages applied to the first plus transfer line and the first minus transfer line, and the second output data signal is generated based on the voltages applied to the second plus transfer line and the second minus transfer line, and the reference output data signal is generated based on a first dividing voltage and a second dividing voltage, and wherein the first dividing voltage is generated by dividing the voltage between the first plus transfer line and the first minus transfer line, and the second dividing voltage is generated by dividing the voltage between the second plus transfer line and the second minus transfer line.

10. The method of claim 9, wherein the first high voltage, the first middle voltage and the first low voltage are equal to the second high voltage, the second middle voltage and the second low voltage, respectively.

11. The method of claim 9, wherein the first dividing voltage is an average of the voltages in the first plus transfer line and the first minus transfer line, and wherein the second dividing voltage is an average of the voltages in the second plus transfer line and the second minus transfer line.

12. The method of claim 9, wherein the first transfer data signal and the second transfer data signal are transited at same timing points with the reference transfer data signal.

13. The method of claim 9, wherein the first transfer data signal and the second transfer data signal are transited at different timing points from the reference transfer data signal.

14. The method of claim 13, wherein the first transfer data signal and the second transfer data signal are transited at the center of the transition times of the reference transfer data signal.

15. The method of claim 9, wherein the reference output data signal is a clock signal.

* * * * *